United States Patent
Hurst et al.

(10) Patent No.: US 7,200,867 B2
(45) Date of Patent: *Apr. 3, 2007

(54) WEBCRAWL INTERNET SECURITY ANALYSIS AND PROCESS

(75) Inventors: Dennis Wayne Hurst, Alpharetta, GA (US); Darrin Ray Barrall, Conyers, GA (US); Caleb Ikaki Sima, Woodstock, GA (US)

(73) Assignee: S.P.I. Dynamics, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/348,416

(22) Filed: Feb. 7, 2006

(65) Prior Publication Data

US 2006/0137014 A1    Jun. 22, 2006

Related U.S. Application Data

(62) Division of application No. 09/722,655, filed on Nov. 28, 2000, now Pat. No. 6,996,845.

(51) Int. Cl.
*G06F 11/30* (2006.01)

(52) U.S. Cl. .......................... 726/25; 726/22
(58) Field of Classification Search ............... 726/4, 726/22, 25
See application file for complete search history.

(56) References Cited

U.S. PATENT DOCUMENTS

| | | | |
|---|---|---|---|
| 6,996,845 B1 * | 2/2006 | Hurst et al. ................ | 726/25 |
| 7,073,198 B1 * | 7/2006 | Flowers et al. ............. | 726/25 |
| 7,096,502 B1 * | 8/2006 | Fox et al. .................. | 726/25 |
| 2001/0034847 A1 * | 10/2001 | Gaul, Jr. ..................... | 713/201 |

* cited by examiner

*Primary Examiner*—Matthew Smithers
(74) *Attorney, Agent, or Firm*—Stites & Harbison, PLLC; Ross F. Hunt, Jr.

(57) ABSTRACT

An automated Web security analysis system and process identifies security vulnerabilities in a target Internet Web site by parsing through the target Web sit to search for a predetermined list of common security vulnerabilities. The process is recursive, exploiting information gathered throughout the process to search for additional security vulnerabilities. A prioritized list of detected security vulnerabilities is then presented to a user, including preferably a list of recommendations to eliminate the detected security vulnerabilities.

72 Claims, 2 Drawing Sheets

WEBCRAWL INTERNET SECURITY ANALYSIS AND PROCESS

RELATED APPLICATIONS

This application is a Divisional of application Ser. No. 09/722,655, INTERNET SECURITY ANALYSIS AND PROCESS, filed Nov. 28, 2000 now U.S. Pat. No. 6,996,845.

BACKGROUND OF THE INVENTION

1. Field of the Invention

This invention pertains to the field of computer security, and more particularly, to a system and process for analyzing potential security flaws in an Internet Web site.

2. Description of the Related Art

Increasingly, Internet Web sites are being exposed to external attack, or "hacking," which has been defined as the act of penetrating a closed computer system to gain access to knowledge and information that is contained within. IndividualS attack Web sites for a variety of reasons. A report by the United States Federal Bureau of Investigation (FBI) indicates that the originators of proprietary information theft can be classified into six categories. The report shows 35% of the criminals were discontented employees, 28% hackers, 18% other U.S. companies, 11% foreign companies, 8% foreign governments, and 10% miscellaneous. Examples of some well-known attack methods include e-mail bombing, denial-of-service attacks, Trojan horses, worms, and simple back-door entry to a Web site. These attacks can not only cripple or shut down access to an attacked Web site, but can result in unauthorized access to confidential customer information, including access passwords, and even credit card account numbers. The resulting damage to a commercial Web site can easily run into the million of dollars.

According to the most recent FBI report, cyber crimes increased from 547 in 1998 to 1,154 in 1999. The FBI and the Computer Security Institute (Silicon Valley) found that 62% of information security officials reported security breaches in 1999 (National Journal's Technology Daily). These break-ins resulted in $123 million losses from fraud, information theft, sabotage, and viruses.

Many companies use a proprietary base software product for conducting business and are focusing on tools for managing risk, and controlling sabotage against their applications. According to a Cyber-source study of online E-tailors, 75% consider fraud to be a problem, and 62% consider it to be a serious problem. The NIPC, FBI, and United States Treasury, along with the President, have committed themselves to working along side the private sector in putting these concerns to rest. Both the Economic Espionage Act of 1996, and the Theft of Trade Secrets Act (Section 1832) have caused organizations to react promptly to damaging acts of violations.

Yet this problem is still not controlled and is in need of counter-measures. In January of 2000, several denial-of-service (DOS) attacks occurred to well known E-commerce Web sites such as YAHOO® and E-BAY®. Incidents like this have brought the issue of Web site security directly into the public limelight. Of all the individuals polled on the questions of online banking, 65% stated that security was the main concern.

Maintaining control of electronic fraud can be a time consuming process for E-commerce companies, banks, brokerage firms, and electronic billing/payment providers. Both the network administrators and Web-masters do not have the proper tools to detect Web-based vulnerabilities. The complexity of information, separate system options, assessing the significance of penetrations, and a decision for correction is not prevalent in today's workplace. On-line fraud has a special significance for an E-commerce site. The fear of security exploits can cause a negative impact on consumer confidence in an E-commerce site, which ultimately destroys the brand's image.

To prevent such attacks, Web site administrators manually search for and close potential security holes in their own Web sites. Because most Web sites undergo changes over time, and because new vulnerabilities and attack techniques are continually being developed, the Web site administrators must continually probe their sites for security weaknesses. This is time-consuming and fraught with the likelihood of undetected security flaws.

As the Internet continues to expand, more and more Web sites are being developed and operated by less experienced and trained personnel. And it becomes more and more difficult for all of these individuals to be knowledgeable in all of the latest techniques for hacking a Web site. This increases the potential for Web site security flaws to exist which can be exploited by hackers.

Accordingly, there is a need for an advanced Web security analysis system and process that can be used by Web site developers and administrators to identify security flaws in their Internet Web sites. It would also be advantageous to provide such a system and process which can be used by third party individuals who lack specific knowledge of an individual Web site's architecture and design. It would be further advantageous to provide such a system and process which is automated, and which performs a security check without significant manual user intervention. Other and further objects and advantages will appear hereinafter.

SUMMARY OF THE INVENTION

The present invention comprises a system and process for analyzing potential security flaws in an Internet Web site.

In one aspect of the invention, an Internet security analysis system and process checks a target Internet Web site against a predetermined set of known exploits.

In another aspect of the invention, an Internet security analysis process is automated to execute without significant manual user interaction.

In yet another aspect of the invention, an Internet security analysis process is recursive, gathering information of security vulnerabilities and then exploiting that information to search for additional security vulnerabilities.

DESCRIPTION OF THE PREFERRED EMBODIMENTS

In a preferred embodiment, an Internet security analysis process is initiated by a Web site administrator for a target Web site to be analyzed. The process may be executed by an Internet security analysis system, which may be a personal computer having Internet access to the target Web site. Alternatively, a user may conduct the Internet security process through an internet security analysis Web site. In that case, the Internet analysis system may be accessible via a Web server hosting the Internet security analysis Web site. Other embodiments are possible.

Figure 1:
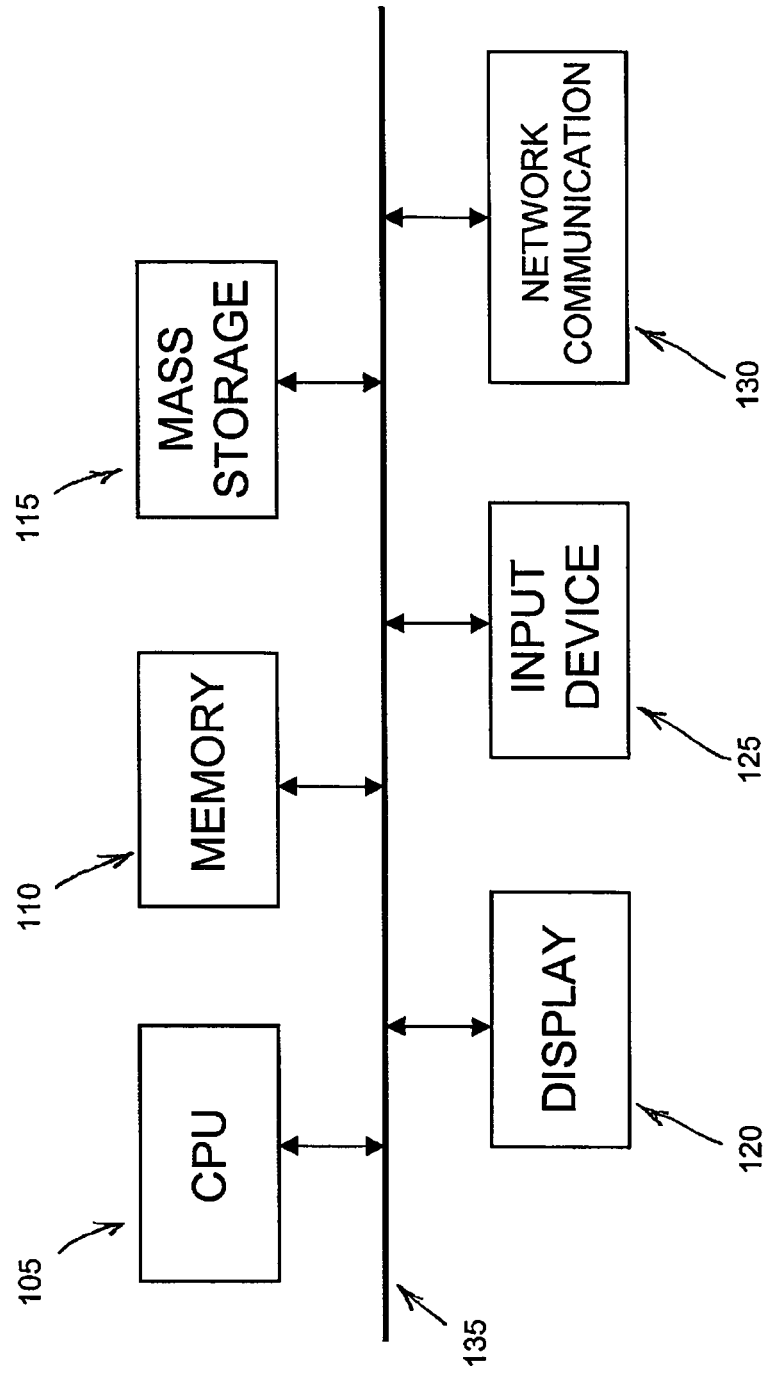
FIG. 1 is a functional block diagram.

FIG. 1 is a block diagram of a preferred embodiment of an Internet security analysis system 100 for performing a security analysis process for a target Web site. In a preferred embodiment, the Internet security analysis system 100 includes at least one central processing unit (CPU) 105 having associated therewith memory 110 and a mass data storage device 115, and optionally a display device 120, a data input device 125 (e.g., keyboard; mouse), and a network connection device 130, all connected to each other via a communication bus 135. The data storage device 115 includes nonvolatile data storage means, such magnetic disk drive units, optical disk drive units, removable disk drive units, tape media, or any combination thereof. The network connection device 130 includes hardware and software for establishing a data link connection between the Internet security analysis system 100 and a target Web site via the Internet. Preferably, the network connection device 130 includes circuitry to tie directly to the Internet via T1, T4 or similar high bandwidth data lines as would be understood by one skilled in the art.

The Internet security analysis system 100 may include two or more integrated computer units, each having a separate CPU 105 having associated therewith memory 110 and/or a mass data storage device 115, and optionally a display device 120 and a data input device (e.g., keyboard; mouse) 125. The communication bus 135 may include two or more internal buses for integrated computer units, together with an external bus connecting two or more integrated computer units.

In a preferred embodiment, the Internet security analysis system 100 executes one or more software routines to perform an automatic security analysis process. The automatic security analysis process analyzes a target Web site to identify security flaws. Preferably, the security analysis process executes a method of parsing through a target Web site to search for common security flaws. For example, in a preferred embodiment, the method includes analyzing the hypertext markup language (HTML) script for the Web pages of the Web site and searching for commented-out references. Such commented-out references may include uniform resource locators (URLs) of Internet addresses for Web pages or other objects which are not intended to be accessed by a visitor to the Web site. Such Web pages or objects may contain data resident on a server hosting the target Web site which is not intended to be available to a visitor. As another example, in a preferred embodiment, the method includes bombarding the data entry fields of any Web forms of the target Web site with data in an attempt to break the target Web site.

Figure 2:
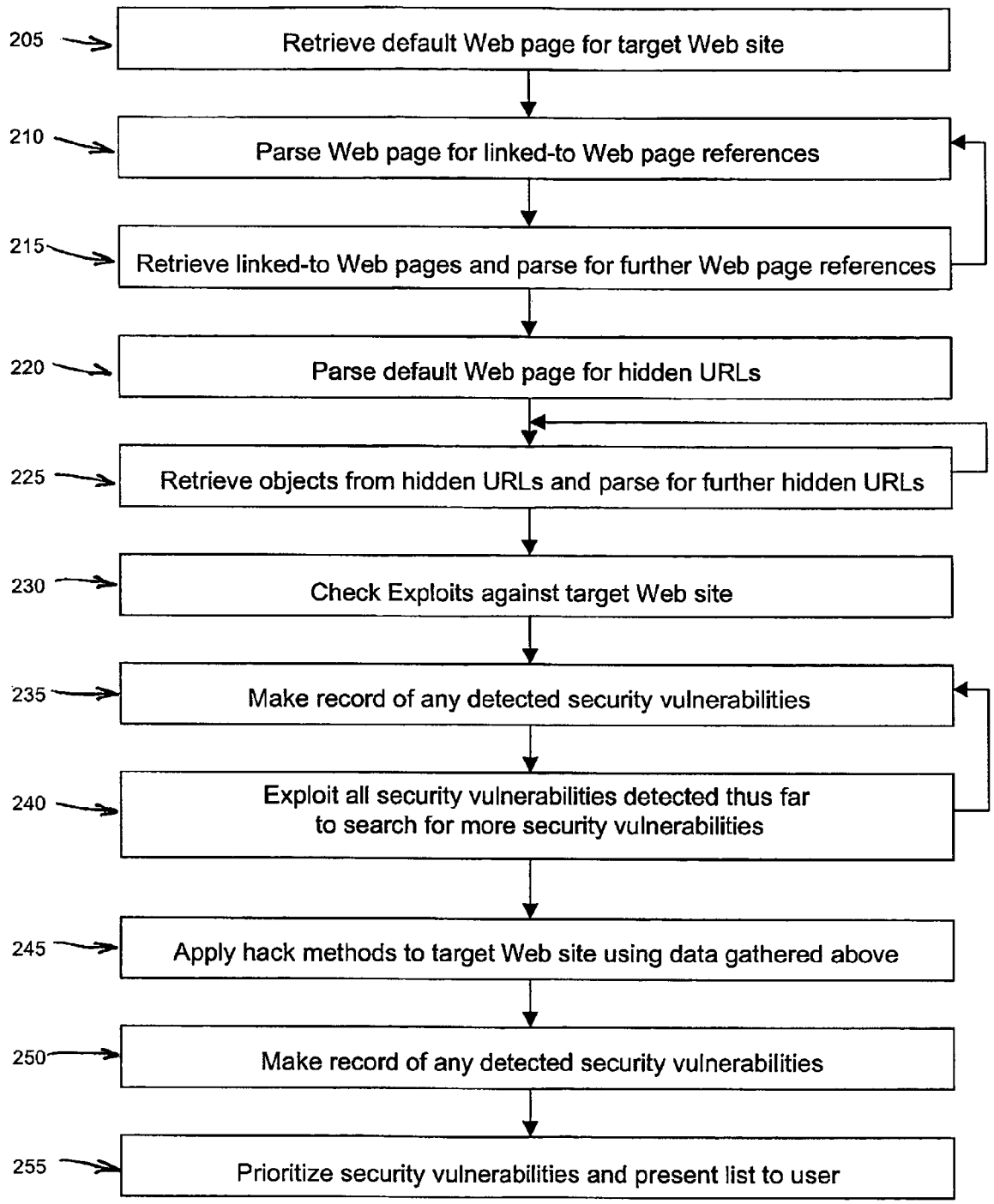
FIG. 2 is a flowchart of a method of parsing through a Web site to identify possible security holes.

A flowchart for a preferred embodiment process 200 of automatically parsing through a target Web site to identify possible security holes is shown in FIG. 2. The process 200 may be initiated by a user and executed by a software program running on the Internet security analysis system 100, which as described above may be preferably a standalone user computer, or a computer accessible to a user via the Internet, etc. Typically, the process 200 is initiated by an administrator of the target Web site.

In a first step 205, an Internet security analysis computer establishes an Internet connection with a Web server hosting an Internet Web site for which a security inspection will be performed (the "target Web site"). The Internet security analysis computer retrieves a default Web page for the target Web site, e.g., "Index.html."

In a step 210, the Internet security analysis system 100 parses through the script (e.g., HTML code) for the default Web page to search for any linked-to Web pages or other objects which are referenced. The URL or address of each linked-to Web page is then stored in a database at the Internet security analysis computer. In particular, the Internet security analysis computer parses through Web pages looking for anchor links and JAVASCRIPT® links.

In a step 215, each linked-to Web page is then in turn retrieved by the Internet security analysis computer and the script for the retrieved Web page is parsed to search for any further linked-to Web pages. This process is repeated for each link and each linked-to Web page that is found. Preferably, the "depth" of linked-to Web pages which are retrieved may be set by a user to any value, so that only first or second level linked-to Web pages may be retrieved. Alternatively, only linked-to Web pages which are hosted on a same server, or which have a same domain address, as the default Web page may be retrieved.

As a result of the steps 205–215, the Internet security analysis system builds a valid Web page database with an entire map of the valid Web pages of the target Web site.

Then, in a step 220, the default Web page for the target Web site is parsed for any hidden Uniform Resource Locators (URLs), such as commented-out code, or any reference to a file or Web page that is not linked-to (or HREF'ed). These hidden URLs are then checked against the valid Web page database to insure that the Internet security analysis system has not already retrieved the corresponding hidden Web page or object. If the corresponding hidden Web page or object has not previously been retrieved, then the address is stored in a prioritized database of "vulnerable" Web pages at the Internet security analysis computer.

In a step 225, each hidden Web page or object is then in turn retrieved by the Internet security analysis system and the script is parsed to search for any further hidden URLs. If any further hidden URLs are found, then the Internet security analysis system retrieves the corresponding hidden Web page or object for the hidden URL and parses through it to search for any still further hidden URLs. This process is repeated for each link and each linked-to Web page or object that is found.

As a result of the steps 220–225, the Internet security analysis system builds a vulnerable Web page database with an entire map of the "vulnerable" Web pages of the target Web site. Together, the steps 205–225 constitute a "Webcrawl" of the entire target Web site, performed by parsing through each retrieved Web page in turn to find additional links.

Preferably, when the Internet security analysis system 100 parses through each retrieved Web page, it performs a keyword search to detect points of interest. For instance, if a Web page is retrieved thru the Webcrawl with the word "admin" located in the Web page, the Internet security analysis system 100 will flag it as a "point of interest" and name it as "possible administration Web page."

Then, in a step 230, the Internet security analysis system 100 checks a predetermined—but extensible—list of known, common security vulnerabilities. Typically, these security vulnerabilities are "exploits" which have become well known to security experts. The Internet security analysis system scans the target Web site to determine whether or not any of the exploits are present at the target Web site.

For example, assume a case where the following three security vulnerabilities are to be checked:

/security/exploit.asp
/security/vuln.asp
/security/b00m.asp

In that case, the Internet security analysis system will issue a request to the target Web site for the directory "security." The Web server for the target Web site will issue either a true or false response, depending on whether the directory exists or not. If the response is true (indicating that the directory does exist), then the above-mentioned three security vulnerabilities are checked to determine whether they exist.

In the above case, it is also possible to perform a keyword search on each response received to detect points of interest. For instance, if a response is received with the keyword "<DIR>" included, the Internet security analysis system 100 will flag it as a vulnerability.

As another example, assume that the "Webcrawl" in the steps 205–225 retrieved the URL "/scripts/db/msadcs.dll" and stored it in the vulnerable Web pages database, and that "/msadc/msadc.dll" is stored in the list of known, common security vulnerabilities. In that case, in the step 230, the Internet security analysis system 100 takes the actual filename of the check (msadcs.dll) and flags it as being present in "/sripts/db/msadcs.dll.

and flags it as being present in "/scripts/db/msadcs.dll." This allows the Internet security analysis system 100 to find a security vulnerability even though it is out of its normal location. Once a security vulnerability is found in an alternate directory the Internet security analysis system 100 will check for other files that typically reside with the file that was found. For example, if "msadcs.dll" is usually in a folder that also contains "msadcs2.dll", then the Internet security analysis system 100 would also check for the existence of "msadcs2.dll" in the "/scripts/db" folder where "msadcs.dll" was found.

Another security vulnerability check which may be employed by the Internet security analysis system 100 is common file name checking. For example, the Internet security analysis system 100 will recursively try to request WS_FTP.LOG from all directories retrieved from the Webcrawl.

Yet another security vulnerability check which may be employed by the Internet security analysis system 100 is port scanning (scanning a machine for open ports) integrated with Web server discovery. By taking the information retrieved from a port scanner (port open on any given host) the Internet security analysis system 100 will attempt to determine whether that port is supporting HTTP or HTTPS. If the port returns valid on any HTTP or HTTPS request then the server is marked as a Web server sitting on that specific port. The Internet security analysis system 100 will go through an entire range of hosts, trying each port with this method. When completed, the Internet security analysis system 100 will have a list of hosts that are currently hosting a Web server and the port or ports on which the Web server is listening. The Internet security analysis system 100 will then take this list and pass it to the "Webcrawl engine" portion of the Internet security analysis system 100. This allows an easy ability to scan an entire network and look for Web vulnerabilities.

If a security vulnerability exists, then in a step 235 a record of the security vulnerability is added to a security vulnerability database maintained at the Internet security analysis system 100.

Accordingly, an efficient and intelligent vulnerability search is conducted. Because a Web site may be very large and contain hundreds or more Web pages and dozens or more exploits must be checked, the above-described process of determining the appropriateness of a security check before actually issuing the check greatly expedites the automated security check process.

Advantageously, in a step 240 the Internet security analysis system further exploits each of the vulnerabilities detected in the step 235 and added to the security vulnerability database to search for further security vulnerabilities and to gather other information regarding the target Web site. This process is recursively repeated until no new data is obtained.

In a step 245, the Internet security analysis system applies a predetermined—but extensible—list of hack methods to the data which was retrieved in the steps 205–240 to identify security vulnerabilities.

In a preferred embodiment, a first hack method comprises the Internet security analysis system issuing a series of requests, such as:
GET/$SERVER_NAME/$SCRIPT_NAME?$VAR1=/*/*/*/boot.ini
GET/$SERVER_NAME/$SCRIPT_NAME?$VAR2=/*/*/*/boot.ini These requests check every script name and variable at the target Web site for a "Directory traversal exploit." If any of these requests return a positive result, then a security vulnerability has been found.

In a second hack method, the Internet security analysis system searches for buffer overflows by issuing a series of requests such as:
GET/$SERVER_NAME/
  $SCRIPT_NAME?$VAR1=AAAAAAA . . . (2048 more A's)
GET/$SERVER_NAME/
  $SCRIPT_NAME?$VAR2=AAAAAAA . . . (2048 more A's)

These requests check every script name and variable at the target Web site for unexpected results in the case of a buffer overflow. If any unexpected data is returned, then a security vulnerability has been found.

In a third hack method, the Internet security analysis system searches for old files or variables which are still present on a Web server for the target Web site, but which are not intended to be available to a visitor. The Internet security analysis system searches issue a series of requests such as:
GET/$SERVER_NAME/$SCRIPT_NAME.old
GET/$SERVER_NAME/$SCRIPT_NAME.bak
GET/$SERVER_NAME/$SCRIPT_NAME.bac These requests are issued for every script name and variable at the target Web site.

Although a preferred embodiment process includes the three hack methods described above, additional hack methods are also possible and may be employed.

For example, where the Web site includes a Web form, intentionally invalid data may be entered into one or more data entry fields of the Web form and submitted to the Web site to determine if any invalid or unexpected results are produced by the Web site. This process may recursively submit various combinations of invalid data entered into the various data entry fields of the Web form. Once a security vulnerability is detected in this way, the data producing the vulnerability may then be used as a starting point for testing all other Web forms at the target Web site.

Preferably, a user may also employ cookie or HTML manipulation to search for security vulnerabilities. The Internet security analysis system 100 will allow a user to intercept the communication between a browser and a Web server and give the user the option to change or manipulate the data being sent between the client and server before the data is actually sent. This allows a user to manipulate the communication in any way, including cookies and over SSL communication. The Internet security analysis system 100 allows a user to create an HTTP or HTTPS request from either an existing request that has already been sent to the server or to create a new request on the fly, including the ability to add, modify or not send any of the following: the URL; parameters that are sent to the server; any Header that is sent in the request; cookies that are sent to the server; and the method that is used to send the request (i.e.: HEAD, POST, GET).

If during the Webcrawl in the steps 205-225, the Internet security analysis system 100 encounters what it deems to be a login page, it will give the option to the user to "brute force" the login (try multiple logins and passwords until a successful one is retrieved), or to automate the login so that the Internet security analysis system 100 will brute force it automatically, and the user does not have to stop the scan and will brute force it automatically.

Preferably, there are two methods of brute forcing a login screen it can either be a form login or a basic authorization "pop-up box" login.

The Internet security analysis system 100 also preferably supports passing of user defined user names and passwords that are sent to the target server. This facilitates testing of target Web sites that require a login name and password to gain access to the target Web site, or a folder on the target Web site.

Moreover, in some cases one or more of the above-described hack methods may not be used. Optionally, the user may choose the hack methods which are employed.

If any of security vulnerabilities have been found in the step 245, then in a step 250 the Internet security analysis system adds a record for the security vulnerability to the security vulnerability database.

Finally, in a step 255, the Internet security analysis system prioritizes all security vulnerabilities which have been identified in the steps 205-250, and presents the prioritized list to the user, for example on a computer display screen. For example, it is known that a "SQL server error" is high risk vulnerability, and accordingly, this will be communicated to the user via the prioritization. Preferably, the Internet security analysis system also suggests how the user may eliminate the detected security vulnerabilities.

In a preferred embodiment, a user may disable the automatic operation and instead control one or more aspects of how the Internet security analysis process executes. For example, the user may be allowed to change the values sent to the target Web site in the step 245. The user may also view any malformed "cookies" which are returned during the Internet security analysis process. The user may manually edit and change the HTML code for any Web page which is retrieved from the Web site and then submit the changed Web page back to the server for the target Web site. This facilitates scanning of applications where specific user interaction (e.g., username and password) are required to gain access to the application, or where an automated scan could be dangerous to the application. One example of an application where an automated scan could be dangerous would be administrative application that has elevated access to the target Web site.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

We claim:

1. A process of detecting security vulnerabilities present in a target Web site, comprising the steps of:
    establishing an Internet connection with the target Web site;
    retrieving a Web page for the target Web site;
    parsing through the Web page to identify any linked-to Web pages or objects which are included in the Web page; and
    identifying security vulnerabilities by performing at least one of the steps of (i) scanning the target Web site for at least one vulnerability and (ii) applying at least one hack method to the target Web site.

2. The process of claim 1 wherein the step of identifying security vulnerabilities comprises both of the steps (i) scanning the target Web site for at least one vulnerability and (ii) applying at least one hack method to the target Web site.

3. The process of claim 1 further comprising automatically passing an authorized username and password to the target Web site, if required to gain access to the target Web site.

4. The process of claim 1, further comprising scanning at least one of the security vulnerabilities for at least one exploit in order to identify further security vulnerabilities.

5. The process of claim 1, further comprising parsing through the linked-to Web pages to identify any further-linked-to Web pages or objects which are included in the linked-to Web pages.

6. The process of claim 5, further comprising parsing through the first mentioned Web page to identify any hidden Web pages or objects which are included in the hidden Web pages.

7. The process of claim 6, further comprising parsing through the hidden Web-pages to identify any further-hidden Web pages or objects which are included in the further-hidden Web pages.

8. The process of claim 7, further comprising:
    comparing each hidden Web page and each further-hidden Web page to each linked-to Web page and each further-linked-to Web page; and
    identifying each hidden Web page and each further-hidden Web page that is different from the linked-to Web pages and the further-linked to Web pages.

9. The process of claim 6, wherein the step of identifying security vulnerabilities comprises applying at least one hack method and includes attempting to access unauthorized files located outside the target Web site's root directory.

10. The process of claim 9, wherein the step of identifying security vulnerabilities comprises scanning the target Web site for at least one vulnerability and includes checking for at least one common filename.

11. The process of claim 10, wherein the at least one common filename is selected from the group consisting of "msadcs.dll" and "WS_FTP.LOG."

12. The process of claim 6, wherein the step of identifying security vulnerabilities comprises applying at least one hack method and includes automatically passing multiple usernames and passwords to the target Web site if a login Web page is encountered.

13. The process of claim 5, wherein the parsing through the first mentioned Web page and the parsing through the linked-to Web pages include performing a keyword search in order to detect at least one point of interest.

14. The process of claim 13, wherein the at least one point of interest is selected from the group consisting of an administration Web page and a directory list tag.

15. The process of claim 14, wherein the step of identifying security vulnerabilities comprises applying at least one hack method and includes attempting to access unauthorized files located outside the target Web site's root directory.

16. A process of detecting security vulnerabilities present in a target Web site, comprising the steps of:
  establishing an Internet connection with the target Web site;
  retrieving a Web page for the target Web site;
  parsing through the Web page to identify any linked-to Web pages or objects which are included in the Web page, wherein the parsing includes performing a keyword search in order to detect at least one point of interest;
  identifying security vulnerabilities by performing at least one of the steps of (i) scanning the target Web site for at least one vulnerability and (ii) applying at least one hack method to the target Web site; and
  prioritizing the security vulnerabilities.

17. The process of claim 16 wherein the step of identifying security vulnerabilities comprises both of the steps (i) scanning the target Web site for at least one vulnerability and (ii) applying at least one hack method to the target Web site.

18. The process of claim 17, wherein the applying of at least one predetermined hack method includes attempting to access unauthorized files located outside the target Web site's root directory.

19. The process of claim 17, further comprising automatically passing an authorized username and password to the target Web site, if required to gain access to the target Web site.

20. The process of claim 17, wherein the applying of at least one hack method includes automatically passing multiple usernames and passwords to the target Web site if a login Web page is encountered.

21. The process of claim 17, wherein the applying of at least one hack method includes passing invalid data to a data entry field of the target Web site and evaluating the result.

22. The process of claim 21, further comprising:
  recording the invalid data which produces a security vulnerability; and
  passing the recorded invalid data to at least one other data entry field of the target Web site.

23. The process of claim 16, further comprising parsing through the Web page to identify any hidden Web pages or objects which are included in the hidden Web pages.

24. The process of claim 23, further comprising parsing through the hidden Web-pages to identify any further-hidden Web pages or objects which are included in the further-hidden Web pages.

25. The process of claim 24, further comprising:
  comparing each hidden Web page and each further-hidden Web page to each linked-to Web page and each further-linked-to Web page; and
  identifying each hidden Web page and each further-hidden Web page that is different from the linked-to Web pages and the further-linked to Web pages.

26. The process of claim 16, further comprising parsing through the linked-to Web pages to identify any further-linked-to Web pages or objects which are included in the linked-to Web pages.

27. The process of claim 26, wherein the at least one point of interest is selected from the group consisting of an administration Web page and a directory list tag.

28. The process of claim 26, further comprising scanning at least one of the security vulnerabilities for at least one exploit in order to identify further security vulnerabilities.

29. A process of detecting security vulnerabilities present in a target Web site, comprising the steps of:
  establishing an Internet connection with the target Web site;
  retrieving a Web page for the target Web site;
  parsing through the Web page to identify any linked-to Web pages or objects which are included in the default Web page;
  scanning the target Web site for at least one exploit in order to identify security vulnerabilities;
  applying at least one hack method to the target Web site in order to identify security vulnerabilities, wherein the applying at least one hack method includes attempting to access unauthorized files located outside the target Web site's root directory; and
  outputting the security vulnerabilities.

30. The process of claim 29, further comprising scanning at least one of the security vulnerabilities for at least one known exploit in order to identify further security vulnerabilities.

31. The process of claim 29, further comprising parsing through the linked-to Web pages to identify any further-linked-to Web pages or objects which are included in the linked-to Web pages.

32. The process of claim 31, further comprising parsing through the first mentioned Web page to identify any hidden Web pages or objects which are included in the hidden Web pages.

33. The process of claim 32, further comprising parsing through the hidden Web-pages to identify any further-hidden Web pages or objects which are included in the further-hidden Web pages.

34. The process of claim 33, further comprising:
  comparing each hidden Web page and each further-hidden Web page to each linked-to Web page and each further-lipked-to Web page; and
  identifying each hidden Web page and each further-hidden Web page that is different from the linked-to Web pages and the further-linked to Web pages.

35. The process of claim 31, wherein the parsing through the default Web page and the parsing through the linked-to Web pages include performing a keyword search in order to detect at least one point of interest.

36. The process of claim 35, wherein the at least one point of interest is selected from the group consisting of an administrative Web page and a directory list tag.

37. The process of claim 36, further comprising automatically passing an authorized username and password to the target Web site, if required to gain access to the target Web site.

38. The process of claim 31, wherein the scanning the target Web site for at least one known exploit includes checking for at least one common filename.

39. The process of claim 38, wherein the at least one common filename is selected from the group consisting of "msadcs.dll" and "WS_FTP.LOG."

40. A system for detecting security vulnerabilities present in a target Web site, comprising:
  memory for storing:
    a Web page database; and
    a security vulnerability database; and
  a processor connected to the memory and being configured to:
    establish an Internet connection with the target Web site;
    retrieve a Web page for the target Web site;
    parse through the Web page to identify any linked-to Web pages or objects which are included in the Web page;
    identify security vulnerabilities by performing at least one of (i) scanning the target Web site for at least one vulnerability and (ii) apply at least one hack method to the target Web site; and
    prioritize the security vulnerabilities.

41. The system of claim 40 wherein the processor identifies security vulnerabilities by both (i) scanning the target Web site for at least one vulnerability and (ii) apply at least one hack method to the target Web site.

42. The system of claim 41, wherein the processor is configured to apply at least one hack method by attempting to access unauthorized files located outside the target Web site's root directory.

43. The system of claim 42, wherein the parsing through the first mentioned Web page and the parsing through the linked-to Web pages include performing a keyword search in order to detect at least one point of interest.

44. The system of claim 43, wherein the at least one point of interest is selected from the group consisting of an administrative Web page and a directory list tag.

45. The system of claim 41, wherein the processor is configured to apply at least one hack method to the target Web site by automatically passing multiple usernames and passwords to the target Web site if a login Web page is encountered.

46. The system of claim 40 wherein the processor is configured to automatically pass an authorized username and password to the target Web site, if required to gain access to the target Web site.

47. The system of claim 40, wherein the processor is further configured to parse through the linked-to Web pages to identify any further-linked-to Web pages or objects which are included in the linked-to Web pages.

48. The system of claim 47, wherein the processor is further configured to scan at least one of the security vulnerabilities for at least one known exploit in order to identify further security vulnerabilities.

49. The system of claim 48, wherein the processor is further configured to parse through the first mentioned Web page to identify any hidden Web pages or objects which are included in the hidden Web pages.

50. The system of claim 49, wherein the processor is further configured to parse through the hidden Web-pages to identify any further-hidden Web pages or objects which are included in the further-hidden Web pages.

51. The system of claim 50, wherein the processor is further configured to:
  compare each hidden Web page and each further-hidden Web page to each linked-to Web page and each further-linked-to Web page; and
  identify each hidden Web page and each further-hidden Web page that is different from the linked-to Web pages and the further-linked to Web pages.

52. A system for detecting security vulnerabilities present in a target Web site, comprising:
  memory for storing:
    a Web page database; and
    a security vulnerability database; and
  a processor connected to the memory and being configured to:
    establish an Internet connection with the target Web site;
    retrieve a Web page for the target Web site;
    parse through the Web page to identify any linked-to Web pages or objects which are included in the Web page, wherein the parsing includes performing a keyword search in order to detect at least one point of interest; and
    identify security vulnerabilities by performing at least one of (i) scanning the target Web site for at least one vulnerability and (ii) apply at least one hack method to the target Web site.

53. The system of claim 52 wherein the processor identifies security vulnerabilities by both (i) scanning the target Web site for at least one vulnerability and (ii) apply at least one hack method to the target Web site.

54. The system of claim 52, wherein the processor is further configured to scan at least one of the security vulnerabilities for at least one know exploit in order to identify further security vulnerabilities.

55. The system of claim 52, wherein the processor is further configured to parse through the linked-to Web pages to identify any further-linked-to Web pages or objects which are included in the linked-to Web pages.

56. The system of claim 55, wherein the at least one point of interest is selected from the group consisting of an administrative Web page and a directory list tag.

57. The system of claim 55, wherein the processor is further configured to parse through the hidden Web-pages to identify any further-hidden Web pages or objects which are included in the further-hidden Web pages.

58. The system of claim 57, wherein the processor is further configured to:
  compare each hidden Web page and each further-hidden Web page to each linked-to Web page and each further-linked-to Web page; and
  identify each hidden Web page and each further-hidden Web page that is different from the linked-to Web pages and the further-linked to Web pages.

59. The system of claim 55, wherein the processor is further configured to automatically pass an authorized username and password to the target Web site, if required to gain access to the target Web site.

60. The system of claim 59, wherein the processor is configured to apply at least one hack method by attempting to access unauthorized files located outside the target Web site's root directory.

61. The system of claim 55, wherein the processor is configured to apply at least one hack method by passing invalid data to a data entry field of the target Web site and evaluating the result.

62. The system of claim 61, wherein the processor is further configured to:
  record the invalid data which produces a security vulnerability; and
  pass the recorded invalid data to at least one other data entry field of the target Web site.

63. The system of claim 52, wherein the processor is further configured to parse through the first mentioned Web page to identify any hidden Web pages or objects which are included in the hidden Web pages.

64. A system for detecting security vulnerabilities present in a target Web site, comprising:
  memory for storing:
    a Web page database;
    at least one exploit; and
    a security vulnerability database; and
  a processor connected to the memory and being configured to:
    establish an Internet connection with the target Web site;
    retrieve a Web page for the target Web site;
    parse through the Web page to identify any linked-to Web pages or objects which are included in the Web page;
    scan the target Web site for at least one exploit in order to identify security vulnerabilities; and
    apply at least one hack method to the target Web site in order to identify security vulnerabilities, wherein the applying at least one hack method includes attempting to access unauthorized files located outside the target Web site's root directory.

65. The system of claim 64, wherein the processor is further configured to parse through the linked-to Web pages to identify any further-linked-to Web pages or objects which are included in the linked-to Web pages.

66. The system of claim 65, wherein the processor is further configured to parse through the first mentioned Web page to identify any hidden Web pages or objects which are included in the hidden Web pages.

67. The system of claim 66, wherein the processor is further configured to parse through the hidden Web-pages to identify any further-hidden Web pages or objects which are included in the further-hidden Web pages.

68. The system of claim 67, wherein the processor is further configured to:
  compare each hidden Web page and each further-hidden Web page to each linked-to Web page and each further-linked-to Web page; and
  identity each hidden Web page and each further-hidden Web page that is different from the linked-to Web pages and the further-linked to Web pages.

69. The system of claim 65, wherein the parsing through the first mentioned Web page and the parsing through the linked-to Web pages include performing a keyword search in order to detect at least one point of interest.

70. The system of claim 69, wherein the at least one point of interest is selected from the group consisting of an administration Web page and a directory list tag.

71. The system of claim 64, wherein the processor is further configured to automatically pass an authorized username and password to the target Web site, if required to gain access to the target Web site.

72. The system of claim 71, wherein the processor is further configured to scan at least one of the security vulnerabilities for at least one known exploit in order to identify further security vulnerabilities.

* * * * *

UNITED STATES PATENT AND TRADEMARK OFFICE
CERTIFICATE OF CORRECTION

PATENT NO. : 7,200,867 B2  
APPLICATION NO. : 11/348416  
DATED : April 3, 2007  
INVENTOR(S) : Dennis Wayne Hurst et al.

It is certified that error appears in the above-identified patent and that said Letters Patent is hereby corrected as shown below:

On the Title page, in Item (57), under "Abstract", in column 2, line 3, delete "sit" and insert -- site --, therefor.

In column 5, line 26, delete ""/sripts/db/msadcs.dll." and insert -- "/scripts/db/msadcs.dll." --, therefor.

In column 5, lines 27-28, delete "and flags it as being present in "/scripts/db/msadcs.dll."" before "This allows the Internet security analysis system 100 to find".

In column 8, line 25, in Claim 3, after "claim 1" insert -- , --.

In column 8, line 62, in Claim 11, delete ""msadcs.dil"" and insert -- "msadcs.dll" --, therefor.

In column 10, line 46-47, in Claim 34, delete "further-lipked-to" and insert -- further-linked-to --, therefor.

In column 12, line 26, in Claim 54, delete "know" and insert -- known --, therefor.

In column 14, line 10, in Claim 68, delete "identity" and insert -- indentify --, therefor.

Signed and Sealed this

Seventh Day of October, 2008

JON W. DUDAS  
*Director of the United States Patent and Trademark Office*